United States Patent

Weissermel et al.

[15] 3,673,144

[45] June 27, 1972

[54] THERMOPLASTIC MOLDING COMPOSITIONS CONTAINING POLYESTERS

[72] Inventors: Klaus Weissermel, Kelkheim/Taunus; Rudolf Uebe, Hofheim/Taunus; Horst Pfister, Frankfurt/Main, all of Germany

[73] Assignee: Farbwerke Hoechst Aktiengesellschaft vormals Meister Lucius & Bruning, Frankfurt/Main, Germany

[22] Filed: July 2, 1969

[21] Appl. No.: 838,686

[30] Foreign Application Priority Data

July 4, 1968 Germany.....................P 17 69 729.9

[52] U.S. Cl......................260/30.4 R, 260/40 R, 260/75 EP
[51] Int. Cl............................................................C08g 51/36
[58] Field of Search..............................260/30.4, 348 A, 40

[56] References Cited

UNITED STATES PATENTS 2,781,333  2/1957  Updegraff..........................260/348 A
3,060,147  10/1962  Schlegel...........................260/348 A
3,479,318  11/1969  Jackson et al. ..........................260/40
3,516,957  6/1970  Gray et al. ...............................260/40
3,547,872  12/1970  Weissermel et al. .................260/40 R Primary Examiner—Morris Liebman
Assistant Examiner—S. M. Person
Attorney—Curtis, Morris & Safford

[57] ABSTRACT

The present invention relates to polyester molding compositions from linear saturated polyesters, inert inorganic solid materials and 2,3-epoxy propanol esters of polyfunctional carboxylic acids of the formula

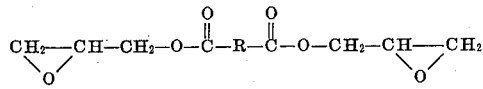

which molding compositions may be worked up in the thermoplastic range and from which molded articles can be made which are free from flash-formation.

17 Claims, No Drawings

THERMOPLASTIC MOLDING COMPOSITIONS CONTAINING POLYESTERS

The present invention relates to thermoplastic molding compositions containing polyesters.

It has been proposed to work up polyesters derived from aromatic dicarboxylic acids and suitable aliphatic diols under certain conditions in the thermoplastic range into molded articles. The utilitarian properties of the polyethylene terephthalate must be modified to the effect that, in the first place, the injection-molded pieces crystallize in the mold as rapidly and as completely as possible, in the second place, flash-formation does not occur and, in the third place, the thermal degradation during injection-molding is as low as possible. It is not possible to avoid the thermal degradation of the polyester mass and flash-formation alone by modifying the working conditions since the working temperature of polyethylene terephthalate lies above 250° C owing to the high melting point. The dwell pressure during the injection-molding process must have a definite magnitude since otherwise the mold is not filled completely which, on the other hand, gives rise to the undesirable flash-formation.

The speed of crystallization is regulated in such a manner that the material is injection-molded into heated molds as well as by adding nucleating agents which are added to the polyester, for example, in the form of triturated minerals.

Now we have found that a thermoplastic polyester molding composition comprising a. a linear saturated polyester of an aromatic dicarboxylic acid and, optionally, an amount of up to 10 percent by weight of an aliphatic dicarboxylic acid, with a saturated aliphatic or cycloaliphatic diol, and b. from 0.05 to 2 percent by weight, preferably 0.1 to 0.5 percent by weight, calculated on the polyester, of an inert, inorganic solid material having a particle size below 5 microns, c. from 0.01 to 2 percent by weight, preferably 0.05 to 0.6 percent by weight, calculated on the polyester, of 2,3-epoxy propanol ester of polyfunctional carboxylic acids of the formula

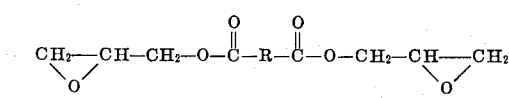

in which R represents an alkylene, cycloalkylene, arylene or aralkylene group possibly containing ether groups, and which may possibly contain additional carboxyl groups esterified with 2,3-epoxy propanol,
possesses excellent properties.

Even when applying relatively small amounts of the polyfunctional glycidyl esters according to the invention, flash formation does not occur at all even when high injection pressures are employed. Simultaneously there is obtained an increase of the speed of crystallization, for during the injection-molding process, the molded articles attain the optimum degree of crystallization already after unusually brief residence times in the mold. It is, therefore, possible to employ higher processing speeds, that is to say, to shorten the total molding periods. It is especially remarkable, however, that the addition of these glycidyl esters does not only prevent the thermal degradation of the polyester mass but that, thereby, an increase of the relative specific viscosity can be attained during the injection-molding process.

In the method of the invention, polyethylene terephthalate is preferably used as the linear polyester. However, other polyesters, for example polycyclohexane-(1,4)-dimethylolterephthalate may also be employed. It is also possible to use modified polyethylene terephthalates containing, in addition to terephthalic acid, other aromatic or aliphatic dicarboxylic acids as structural units, for example isophthalic acid, naphthalene-1,6-dicarboxylic acid or adipic acid. There may, furthermore, be used modified polyethylene terephthalates containing, in addition to ethylene glycol, other aliphatic diols such as, for example, neopentyl glycol or butanediol-(1,4) as the alcoholic component. Polyesters from hydroxycarboxylic acids may also be used. The polyesters should have a reduced specific viscosity within the range of from 0.6 to 2.0 dl/g, preferably within the range of from 0.9 to 1.6 dl/g (measured in a 1 percent solution in a 60:40 by weight mixture of phenol and tetrachloroethane at 25° C). Polyesters having a reduced specific viscosity within the range of from 1.1 to 1.5 dl/g may be used with special advantage.

As inorganic nucleating agent there may be used, for example, glass powder, talcum and kaolin, magnesium oxide, antimony trioxide, titanium dioxide, aluminum oxide, calcium carbonate or alkali metal- or alkaline earth metal fluorides. They should preferably have a particle size below 5 microns, preferably below 2 microns.

As 2,3-epoxy propanol ester of polyfunctional carboxylic acids there may be used, for example, the esters of terephthalic acid, phthalic acid, naphthalene-1,6-dicarboxylic acid, trimellitic acid, pyromellitic acid, adipic acid, succinic acid of dodecane-dicarboxylic acid.

To attain the afore-described effects in the process of injection-molding molded pieces, the process is carried out as follows: The crystallization auxiliary is added as such prior to, during or after the polycondensation. In this manner uniformly nucleated polyester granules are obtained. Then the granules are subjected to rotation together with the epoxy ester which is applied either as such or dissolved in a solvent which is subsequently removed. The polyester mass can now directly be injection-molded into molded pieces. However, it is also possible to remelt the coated polyester granules and to granulate the product in order to incorporate the epoxy ester in a homogeneous manner.

Another possibility of preparation consists in subjecting the polyester granules simultaneously to rotation together with the inorganic crystallization auxiliary and the 2,3-epoxypropanol ester and then to transform the polyester mass by melting in an extruder and subsequent granulation into a form which lends itself to injection-molding.

The general working direction is that all operations have to be carried out with the total exclusion of moisture to prevent hydrolysis of the polyester and the 2,3-epoxy-propanol ester. The polyester molding composition should contain less than 0.01 percent by weight of water. When a rapid crystallization in the injection mold and, thereby, a brief molding period is to be attained, it is necessary to heat the mold at a temperature of at least 100° C. Molding temperatures within the range of from 120° to 150° C most advantageous.

The following examples serve to illustrate the invention, but they are not intended to limit it thereto, the parts and percentages being by weight.

EXAMPLES

1. Three times 500 parts of polyethylene terephthalate in granular form, which had a content of 0.4 percent of talcum, a moisture content of 0.008 percent and a relative specific viscosity of 1.50 dl/g, were subjected to rotation, at 75° C, with 0.05, 0.08 and 0.12 percent of bis-2,3-epoxy-propanol succinic acid ester, respectively, during the course of half an hour.

The granules coated in this manner were injection-molded by means of an injection-machine into sheets of dimensions 60 × 2 mm: cylinder temperature, 270°/260°/260° C; temperature of the mold 140° C; injection pressure 140 atmospheres gage; injection time, 15 seconds. The residence time in the mold and the dwell pressure were varied. The density of the sheets with different residence times in the mold and the specific viscosity of the polyester were determined. The results are listed in the table.

2. Five-hundred parts of polyethylene terephthalate in granular from containing 0.4 percent of talcum, which had a moisture content of 0.008 percent and a relative specific viscosity of 1.30 dl/g, were subjected to rotation, at 75° C, together with 0.18 percent of bis-2,3-epoxy-propanol terephthalic acid ester during the course of half an hour. The work-up was carried out in the same manner and under the same conditions as described in Example 1.

3. In comparison with the processes carried out in Examples 1 and 2, there are listed in the Table the values and observations with respect to a polyester material containing 0.5 percent of talcum, which had a relative specific initial viscosity of 1.50 dl/g, a water content of 0.008 percent, but which had not been coated with epoxy ester.

6. A thermoplastic polyester molding composition as claimed in claim 2, in which the linear saturated polyester contains, in addition to ethylene glycol units, another aliphatic diol as the diol component.

7. A thermoplastic polyester molding composition as claimed in claim 6, in which the linear saturated polyester contains, in addition to ethylene glycol units, an aliphatic diol selected from the group consisting of neopentyl glycol or butanediol-1,4 as the diol component.

8. A thermoplastic polyester molding composition as claimed in claim 1, in which the linear saturated polyester

TABLE

| Bis-2,3-epoxy-propanol ester | Amount (percent by weight) | SV (dl./g.) before and after injection molding | | Density of the sheets after a residence in the mold of— | | Flash formation at variable dwell pressure | |
|---|---|---|---|---|---|---|---|
| | | Before | After | 2 sec. | 60 sec. | 15 sec. residence time in the mold/ dwell pressure (atm. gage) | Flash formation |
| Bis-2,3-epoxy-propanol succinic acid ester | 0.5 | 1.50 | 1.42 | | | Up to 100 / From 110 onward | None. / About 0.1 mm. |
| | 0.08 | 1.50 | 1.52 | 1.378 | 1.379 | Up to 140 | None. |
| | 0.12 | 1.50 | 1.58 | | | Up to 70 / From 80 to 140 | Incomplete filling of the mold. / Complete filling of the mold, no flash formation. |
| Bis-2,3-epoxy-propanol terephthalic acid ester | 0.18 | 1.30 | 1.48 | 1.376 | 1.377 | Up to 140 | None. |
| Comparative sample containing no additive | | 1.50 | 1.10 | 1.373 | 1.380 | Up to 70, 140 | 1 mm., 4 mm. |

We claim:
1. A thermoplastic polyester molding composition comprising
   a. a linear saturated polyester of an aromatic dicarboxylic acid and, optionally, an amount of up to 10 % by weight of an aliphatic dicarboxylic acid, with a saturated aliphatic or cycloaliphatic diol,
   b. from 0.05 to 2 percent by weight, calculated on the polyester, of an inert, inorganic solid material having a particle size below 5 microns,
   c. from 0.01 to 2 percent by weight, calculated on the polyester, of a 2,3-epoxy propanol ester of a polyfunctional carboxylic acid of the formula

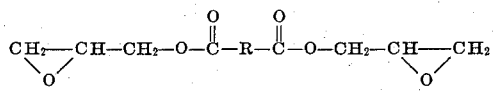

in which R represents an alkylene, cycloalkylene, arylene or aralkylene group possibly containing an ether group, and which may possibly contain an additional carboxyl group esterified with 2,3-epoxy propanol.

2. A thermoplastic polyester molding composition as claimed in claim 1, in which the linear saturated polyester is polyethylene glycol terephthalate.

3. A thermoplastic polyester molding composition as claimed in claim 1, in which the linear saturated polyester is polycyclohexane-1,4-dimethylol terephthalate.

4. A thermoplastic polyester molding composition as claimed in claim 2, in which the linear saturated polyester contains, in addition to terephthalic acid units, another aromatic or aliphatic dicarboxylic acid as the acid component.

5. A thermoplastic polyester molding composition as claimed in claim 4, in which the linear saturated polyester contains, in addition to terephthalic acid units, an aromatic or aliphatic dicarboxylic acid selected from the group consisting of isophthalic acid, naphthalene-1,6-dicarboxylic acid or adipic acid.

contains a hydroxycarboxylic acid as the acid component.

9. A thermoplastic polyester molding composition as claimed in claim 1, in which the polyester has a reduced specific viscosity within the range of from 0.6 to 2.0 dl/g as measured in a 1 percent solution in a 60:40 by weight mixture of phenol and tetrachloroethane at 25° C.

10. A thermoplastic polyester molding composition as claimed in claim 9, in which the polyester has a reduced specific viscosity within the range of from 0.9 to 1.6 dl/g.

11. A thermoplastic polyester molding composition as claimed in claim 9, in which the polyester has a reduced specific viscosity within the range of from 1.1 to 1.5 dl/g.

12. A thermoplastic polyester molding composition as claimed in claim 1, which contains an inert inorganic solid material having a particle size below 2 microns.

13. A thermoplastic polyester molding composition as claimed in claim 1, which contains an inert inorganic solid material selected from the group consisting of glass powder, talcum, kaolin, magnesium oxide, antimony trioxide, titanium dioxide, aluminum oxide, calcium carbonate, and alkali metal fluoride or alkaline earth metal fluoride.

14. A thermoplastic polyester molding composition as claimed in claim 1, which has a content of from 0.1 to 0.5 percent by weight of an inert inorganic solid material.

15. A thermoplastic polyester molding composition as claimed in claim 1, which has a content of from 0.05 to 0.6 percent by weight, calculated on the polyester, of a 2,3-epoxypropanol ester of a polyfunctional carboxylic acid.

16. A thermoplastic polyester molding composition as claimed in claim 1, which contains 2,3-epoxy propanol ester containing, as the polyfunctional carboxylic acid, an acid selected from the group consisting of phthalic acid, naphthalene-1,6-dicarboxylic acid, trimellitic acid, pyromellitic acid, adipic acid, succinic acid or dodecane-dicarboxylic acid.

17. A molded article obtained from the thermoplastic polyester molding composition as claimed in claim 1.

* * * * *